(12) United States Patent
Kanbe

(10) Patent No.: US 7,719,757 B2
(45) Date of Patent: May 18, 2010

(54) MICROCAPSULE, ELECTROPHORETIC DISPLAY SHEET, ELECTROPHORETIC DISPLAY DEVICE, AND ELECTRONIC APPARATUS

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/289,236

(22) Filed: Oct. 23, 2008

(65) Prior Publication Data

US 2009/0059350 A1    Mar. 5, 2009

Related U.S. Application Data

(62) Division of application No. 11/470,492, filed on Sep. 6, 2006, now Pat. No. 7,457,028.

(30) Foreign Application Priority Data

Nov. 21, 2005   (JP) ............................. 2005-336020

(51) Int. Cl.
*G02B 26/00* (2006.01)
*G09G 3/34* (2006.01)

(52) U.S. Cl. ...................................... 359/296; 345/107
(58) Field of Classification Search ................ 359/296; 345/107; 430/32; 204/600
See application file for complete search history.

(56) References Cited

U.S. PATENT DOCUMENTS

| 6,067,185 A | 5/2000 | Albert et al. |
| 6,724,521 B2 | 4/2004 | Nakao et al. |

FOREIGN PATENT DOCUMENTS

| JP | A 2003-140202 | 5/2003 |
| JP | A-2003-330050 | 11/2003 |

*Primary Examiner*—William C Choi
(74) *Attorney, Agent, or Firm*—Oliff & Berridge, PLC

(57) ABSTRACT

A microcapsule includes an electrophoretic dispersion liquid including at least one kind of electrophoretic particle having a polarity, and a capsule body encapsulating the electrophoretic dispersion liquid and made of a polymeric material including one of a nonpolar resin without having a polarity and a resin material having a nonpolar group without having a polarity as a side chain.

9 Claims, 4 Drawing Sheets

MICROCAPSULE, ELECTROPHORETIC DISPLAY SHEET, ELECTROPHORETIC DISPLAY DEVICE, AND ELECTRONIC APPARATUS

This is a Divisional of application Ser. No. 11/470,492 filed Sep. 6, 2006, which claims the benefit of Japanese Patent Application No. 2005-336020 filed Nov. 21, 2005. The disclosures of the prior applications are hereby incorporated by reference herein in their entirety.

BACKGROUND

1. Technical Field

The present invention relates to a microcapsule, an electrophoretic display sheet, an electrophoretic display device, and an electronic apparatus.

2. Related Art

Generally, it is known that micro particles move (migrate) in a liquid by a coulomb power if an electrical field is applied to a dispersal system which micro particles are dispersed into a liquid. This phenomenon is called an electrophoresis. Recently, an electrophoretic display device by using this electrophoresis attracts attention as a new display device that can display desired information (image).

The electrophoretic display device includes a display memory and a wide viewing angle in a state without voltage application, and an ability of high-contrast display in low power consumption.

Since the electrophoretic display device is a nonemissive device, it is less harmful to eyes than an emissive display device such as a cathode-ray tube display.

As an electrophoretic display device like this, a micro capsule type device in which a plurality of micro capsules encapsulating electrophoretic particles (fine particles) and a liquid dispersion medium (a liquid), and a binder fixing each substrate and the micro capsules are arranged between a pair of substrates having electrodes is known.

For a constituent material of the microcapsule, a material with a high polarity such as gum arabic is generally used. On the other hand, for a constituent material of the electrophoretic particle encapsulated in the microcapsule, a polar group or the like is also adopted in order to add electric charge to the electrophoretic particle. Therefore, the microcapsule and the electrophoretic particle are easy to attach to each other, and this inhibits the migration of the electrophoretic particle.

To solve such a problem, a method to prevent a micro capsule and a electrophoretic particle from attaching to each other by covering an inner wall of the microcapsule with a surfactant including a hydrophobic functional group so that the inner wall of the microcapsule becomes a nonpolar state is disclosed. (e.g. JP-A-2003-140202)

However, the above-mentioned method cannot prevent a micro capsule and a electrophoretic particle from attaching to each other sufficiently as the surfactant is detached from the inner wall of the microcapsule as time passes. Further, another problem such as the detached surfactant attaching to electrophoretic particle arises. Therefore, the migration of the electrophoretic particle is inhibited. This causes a problem in which performance of the display function of the electrophoretic display device such as contrast is deteriorated.

SUMMARY

An advantage of the invention is to provide a microcapsule in which an electrophoretic particle can smoothly migrate for long periods, and an electrophoretic display sheet, an electrophoretic display device, and an electronic apparatus that include the microcapsule can maintain a good display performance for long periods.

The present invention achieves as follows.

A microcapsule according to a first aspect of the invention includes an electrophoretic dispersion liquid including at least one kind of electrophoretic particle having a polarity, and a capsule body encapsulating the electrophoretic dispersion liquid and made of a polymeric material including one of a nonpolar resin without having a polarity substantively and a resin material having a nonpolar group without having a polarity substantively as a side chain.

The microcapsule in which an electrophoretic particle can migrate smoothly for long periods is thus obtained.

In the microcapsule according to the first aspect of the invention, the nonpolar resin material preferably includes a styrene-divinylbenzene copolymer as a main constituent.

The styrene-divinylbenzene copolymer is made of a vinyl group and a phenyl group mainly, thereby having a particularly low polarity and serving a non-polarity. Thus, adhesion of the electrophoretic particle to the capsule body is prevented more assuredly.

In the microcapsule according to the first aspect of the invention, it is preferable that the styrene-divinylbenzene copolymer be obtained by polymerizing a styrene monomer and a divinyl monomer at a molar ratio of from 70:30 to 99:1.

Accordingly, the styrene-divinylbenzene copolymer has flexibility with an attempt to have an adequate density at the part having non-polarity. As a result, the capsule body can have moisture resistance and flexibility that can withstand deformation while sufficiently preventing the electrophoretic particle from adhering thereto.

In the microcapsule of the invention, it is preferable that the styrene-divinylbenzene copolymer have a weight-average molecular weight of from 1000 to 1000000.

Thus the styrene-divinylbenzene copolymer can have more optimized density and flexibility at the part having non-polarity.

In the microcapsule according to the first aspect of the invention, the nonpolar group is preferably at least one of an alkyl group and an alkyl fluoride group in which at least a part of hydrogen atoms in an alkyl group is substituted by fluorine atoms.

The nonpolar group has a structure that is especially hard to be charged. Therefore, the electrophoretic particle is assuredly prevented from adhering to the capsule body.

In the microcapsule according to the first aspect of the invention, the number of carbon atoms of the nonpolar group is preferably from four to twenty.

Thus the nonpolar group can last sufficiently long as well as the nonpolar part can cover a large area. Consequently, the electrophoretic particle can keep a further distance from the inner wall of the capsule body so as to prevent the electrophoretic particle from adhering to the capsule body assuredly.

The nonpolar group of the microcapsule according to the first aspect of the invention has preferably a straight-chain shape or a branched shape.

Thereby, when the number of carbon atoms is the same, the length of the nonpolar group extending to the space becomes longer. As a result, the advantageous effect described above is more significantly demonstrated.

It is preferable in the microcapsule according to the first aspect of the invention that the polymeric material include at least one of gum arabic and gelatin.

The polymer like this is favorably used as a constituent material of the capsule body because of its high mechanical strength.

In the microcapsule according to the first aspect of the invention, the polymeric material preferably contains 5 wt % or more of the resin material.

When the content of the resin material in the polymer fails to reach the lower limit, there may be a chance in which the capsule body cannot be in a nonpolar state sufficiently depending on composition of the polymer and the resin material.

An electrophoretic display sheet according to a second aspect of the invention includes a first substrate and the microcapsule according to the first aspect of the invention, being formed on the first substrate.

The electrophoretic display sheet that can keep a fine display performance for long periods is thus obtained.

An electrophoretic display device according to a third aspect of the invention includes the electrophoretic display sheet according to the second aspect of the invention, and a second substrate formed on the microcapsule to hold the micro capsule with the first substrate by sandwiching the microcapsule.

The electrophoretic display sheet that can keep a fine display performance for long periods is thus obtained.

An electronic apparatus according to a fourth aspect of the invention includes the electrophoretic display device according to the third aspect of the invention.

Accordingly, an electronic apparatus with high reliability is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

A microcapsule, an electrophoretic display sheet, an electrophoretic display device, and an electronic apparatus will now be described in detail based on preferred embodiments with reference to the accompanying drawings.

First, the electrophoretic display device according to an embodiment of the present invention will be described.

Figure 1:
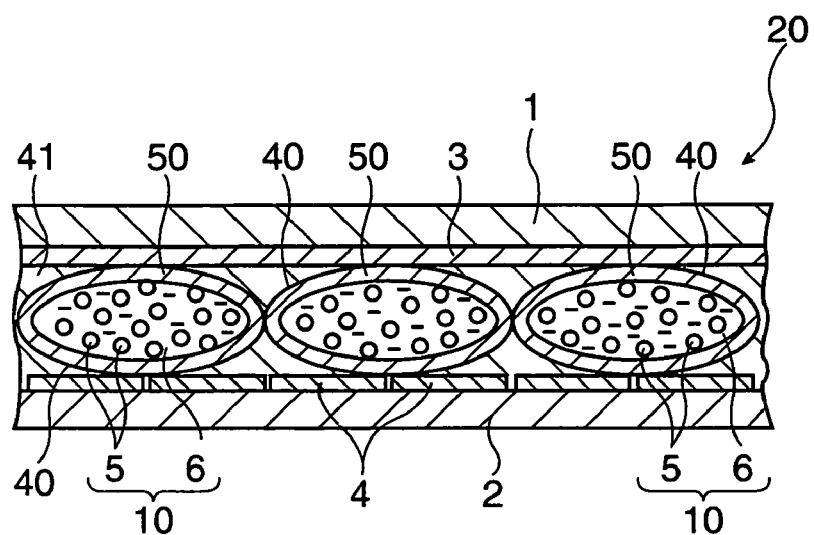
FIG. 1 is a longitudinal-sectional view schematically illustrating an electrophoretic display device according to an embodiment of the invention.

FIG. 1 is a longitudinal cross-sectional view schematically illustrating the embodiment of the electrophoretic display device according to the invention. In the following description, the upper side in FIG. 1 is described as "top", while the lower side is described as "bottom" for simplifying the description.

An electrophoretic display device 20 shown in FIG. 1 includes a first substrate 1 having a first electrode 3, a second substrate 2 having a second electrode 4 that is located in an opposite side of the first electrode 3, and a plurality of microcapsules 40 arranged between the first substrate 1 and the second substrate 2.

The electrophoretic display device 20 shown in FIG. 1 can be either a passive-matrix drive or an active-matrix drive expediently. In a case of the active-matrix drive, the first electrode 3 is a common electrode while the second electrode 4 is a pixel electrode coupled to a transistor.

The electrophoretic display device 20 is sometimes categorized to so-called a front plane composed of the first substrate 1 and a plurality of the microcapsules 40 and so-called a back plane composed of the second substrate 2 due to a circulation of commercial trade. In the invention, this front plane is defined as an electrophoretic display sheet.

A structure of each element will now be described sequentially.

Each of the first substrate 1 and the second substrate 2 is made of a sheet-like (flat-shaped) member, and supports and protects each member located therebetween.

Each of the substrate 1 and the substrate 2 can be flexible or hard. However, it is preferable to be flexible. Using the substrate 1 and the substrate 2 that are flexible, the electrophoretic display device 20 that has flexibility is obtained. This means that the electrophoretic display device 20 is effective to form an electronic paper, for example.

In a case where each of the substrate 1 and the substrate 2 has flexibility, the constituent materials are, for example, polyethylene, polypropylene, polyolefin such as ethylene-vinyl acetate copolymer, modified polyolefin, polyamide (examples: nylon-6, nylon-46, nylon-66, nylon-610, nylon-612, nylon-11, nylon-12, nylon-6-12, nylon-6-66), thermoplastic polyimide, crystalline liquid polymer such as aromatic polyester, polyphenylene oxide, polyphenylene sulfide, polycarbonate, polymethyl methacrylate, polyether, polyether ether ketone, polyetherimide, polyacetal, various kind of thermoplastic elastomers such as styrene series, polyolefine series, polyvinylchloride series, polyurethane series, polyester series, polyamide series, polybutadiene series, transpolyisoprene series, fluororubber series, chlorinated polyethylene series, and copolymer, blended materials, polymer alloy and the like which mainly contain the above materials. One or more than one of the above materials can be mixed to be used.

The (average) thickness of the substrate 1 or the substrate 2 is determined depending on the constituent materials, an application, or the like accordingly. In a case where the substrate 1 or the substrate 2 has flexibility, the thickness is not particularly limited, but it is preferable to be approximately from 20 to 500 μm, more preferably from 25 to 250 μm. Accordingly, the electrophoretic display device 20 is downsized (especially thinned) while harmonizing flexibility and strength thereof.

On the sides of the substrate 1 and the substrate 2 attaching to the microcapsules 40 described later, in other words, on the bottom side of the first substrate 1 and the top side of the second substrate 2, the first electrode 3 and the second electrode 4 are formed in layers (films).

A voltage is applied between the first electrode 3 and the second electrode 4, thereby producing an electric field to apply electrophoretic particles 5.

In the embodiment, the first electrode 3 is a common electrode and the second electrode 4 is an individual electrode (a pixel electrode) divided into a matrix state. A part where the first electrode 3 and one of a plurality of the second electrode 4 are overlapped makes one pixel. The first electrode 3 may be divided into a plurality of electrodes in the same manner as the second electrode 4.

Constituent materials of each of the electrode 3 and the electrode 4 are not particularly limited as long as they are practically conductive. One or more than one of the following various conductive materials can be mixed to be used: a metallic material such as copper, aluminum, nickel, cobalt, platinum, gold, silver, molybdenum, tantalum, or alloys of above materials; a carbonaceous material such as carbon black, carbon nanotube, or fullerne; an electron conductive polymer material such as polyacetylene, polypyrrole, polythiophene, polyaniline, poly (p-phenylene), poly (p-phenylenevinylene), polyfluorene, polycarbazole, polysilane, or derivatives of above materials; an ion conductive polymer material that an ionic material such as $NaCl$, $LiClO_4$, $KCl$, $H_2O$, $LiCl$, $LiBr$, $LiI$, $LiNO_3$, $LiSCN$, $LiCF_3SO_3$, $NaBr$, $NaI$, $NaSCN$, $NaClO_4$, $NaCF_3SO_3$, $KI$, $KSCN$, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $CaBr_2$, $CaI_2$, $CaSCN_2$, $Ca(ClO_4)_2$, $Ca(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, or $Cu(CF_3SO_3)_2$ is dispersed in a matrix plastic such as polyvinyl alcohol, poly carbonate, polyethylene oxide, polyvinyl butyral, polyvinyl carbazole, or vinyl acetate, a conductive oxide material such as indium tin oxide (ITO), fluoride doped tin oxide (FTO), tin oxide ($SnO_2$), or indium oxide (IO).

As other constituent materials of the electrode 3 and the electrode 4, various composite materials to which conductivity is added can be used by mixing a conductive material (a conductive particle) such as gold, silver, nickel, carbon, or the like with a non-conductive material such as a glass material, a rubber material, a polymeric material or the like, for example.

As a specific example of the composite materials, the following materials are cited: a conductive rubber that a conductive material is mixed in a rubber material, a conductive adhesive or a conductive paste that a conductive material is mixed in an adhesive composition such as epoxy, urethane, acrylic or the like, or a conductive plastic that a conductive material is mixed in a matrix resin such as polyolefin, polyvinyl chloride, polystyrene, ABS resin, nylon (polyamide), ethylene vinyl acetate polymer, polyester, acrylic resin, epoxy resin, urethane resin or the like.

Each (average) thickness of the electrode 3 and the electrode 4 is determined depending on the constituent materials, an application, or the like accordingly. It is not limited, but it is preferable that the thickness be approximately from 0.05 to 10 µm, more preferably from 0.05 to 5 µm.

In each of the substrates 1 and 2, and each of the electrodes 3 and 4, the substrate and the electrode to be formed on the side of the display surface (the first substrate 1 and the first electrode 3 in the embodiment) should have an optical transparency. In particular, it is preferable to be transparent (colorless transparent, colored transparent, or translucent) substantively. Thereby, it is easy to distinguish with eyes the state of the electrophoretic particles 5 in the electrophoretic dispersion liquid 10 that will be described later, that is, information (an image) displayed in the electrophoretic display device 20.

Each of the electrode 3 and the electrode 4 may have a multilayered laminate structure, for example, that a plurality of materials are superposed one upon another as well as the aforementioned single layered structure made of a single material. Specifically, each of the electrode 3 and the electrode 4 may have a single layered structure made of ITO, and may have a two-layered laminate structure that includes an ITO layer and a polyaniline layer, for example.

Between the first electrode 3 and the second electrode 4, the plurality of microcapsules 40 are formed by being compressed in the vertical direction and fixed by a binder 41.

The binder 41 can be used, for example, for securing electrical isolation between the electrode 3 and the electrode 4, other than fixing the microcapsules 40. Accordingly, durability and reliability of the electrophoretic display device 20 is improved.

In the binder 41, a resin material is preferably used because of its affinity (adhesion) for each of the electrode 3, the electrode 4, and the microcapsule 40 (a capsule body 50), and excellent insulation property.

As the resin material, it is not particularly limited. However, one or more than one of the following materials can be mixed to be used: for example, thermoplastic resins such as polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, cellulose-based resin, and the like; polymers such as polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, polyether imide, and the like; fluororesins such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, fluororubber, and the like; silicon resins such as silicone resins, silicone rubber, and the like; and other materials such as methacrylic acid-styrene copolymer, polybutylene, methyl methacrylate-butadiene-styrene copolymer, and the like.

Further, a dielectric constant of the binder 41 is preferable to be set almost equal to that of a dispersion medium 6 for preparing an electrophoretic dispersion medium 10 that will be described later. Therefore, a dielectric regulator such as alcohols that are 1,2-butanediol, 1,4-butanediol and the like, ketones, and carboxylates are preferably added to the binder 41, for example.

The microcapsule 40 of the invention includes the electrophoretic dispersion liquid 10 and the capsule body 50 (a capsule shell) that encapsulates (incorporates) the electrophoretic dispersion liquid 10.

Figure 2:
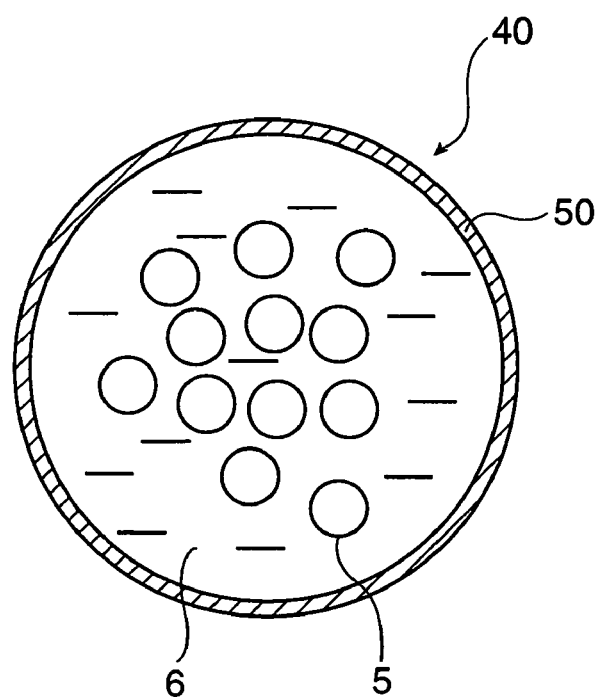
FIG. 2 is a longitudinal cross-sectional view schematically illustrating a microcapsule according to the invention.
Figure 3:
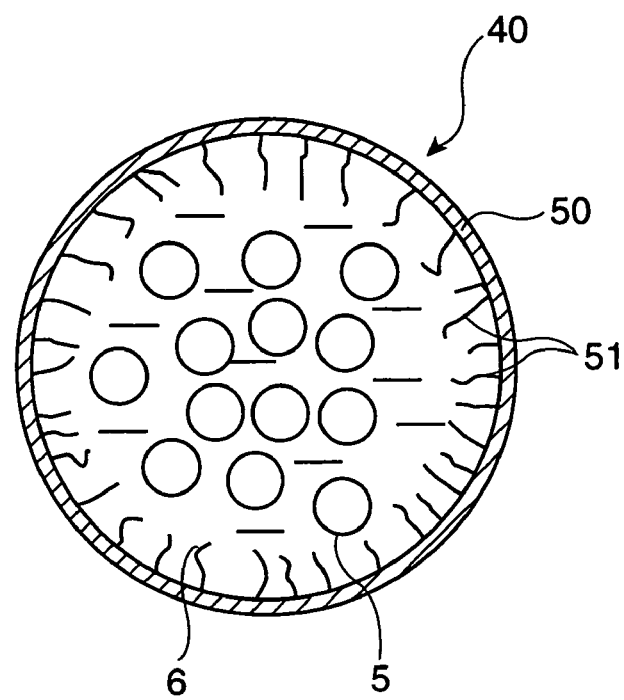
FIG. 3 is a longitudinal cross-sectional view schematically illustrating a microcapsule according to the invention.
Figure 4A:
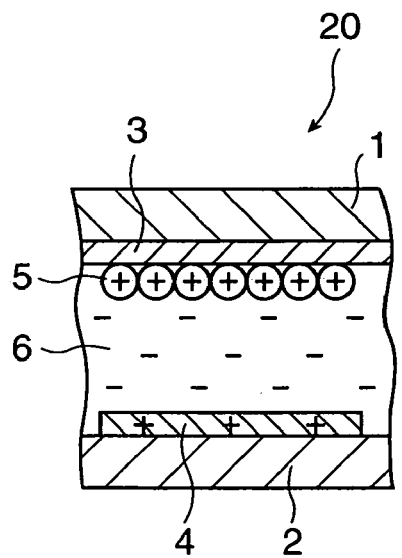
FIGS. 4A and 4B are schematic diagrams showing a principle of operation of the electrophoretic display device illustrated in FIG. 1.
Figure 4B:
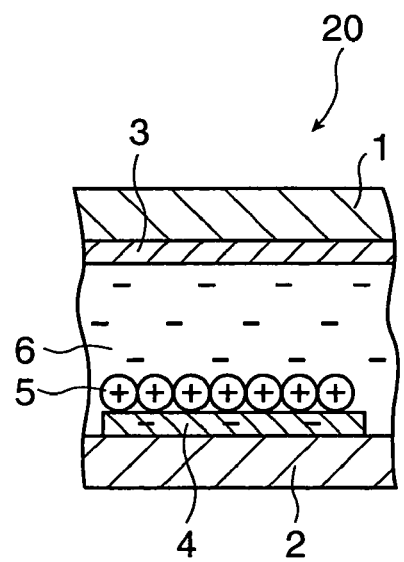

FIGS. 2 and 3 are longitudinal cross-sectional views schematically illustrating the microcapsule of the embodiment of the invention.

The electrophoretic dispersion liquid 10 is composed by dispersing (suspending) the electrophoretic particles 5, which include at least one kind of electrophoretic particle having a polarity, into a dispersion medium 6.

As constituent materials of the electrophoretic particles 5, various materials having a polarity can be used. It is not limited to, but pigment, resin, ceramics, metal and metal oxide, or a mixture that mainly includes at least one kind of thereof. The electrophoretic particles 5 that are mainly made of these materials are easy to be manufactured.

Further, the electrophoretic particles 5 can be made of a compound particle composed of any two or more kinds of the aforementioned materials.

The electrophoretic dispersion liquid 10 can also include a non-electrophoretic particle that does not migrate as it does not have polarity compared to the electrophoretic particles 5.

As the pigment, one or more than one of the following pigments can be mixed to be used: black pigments such as aniline black, carbon black, titanium black, and the like; white pigments such as titanium dioxide, antimony trioxide, barium sulfate, zinc sulfide, zinc oxide, silicon dioxide, and the like; azole pigments such as monoazo, disazo, polyazo, and the like; red pigments such as quinacridone red, chrome vermilion, and the like; blue pigments such as phthalocyanine blue, indanthrene blue, iron blue, ultramarine blue, cobalt blue, and the like; and green pigments such as phthalocyanine green, and the like.

As the resin material, for example, one or more than one kind of material such as acrylic resin, urethane resin, urea resin, epoxy resin, polystyrene, polyester, and the like, can be mixed to be used.

Further, as the compound particle, one in which the surface of a pigment particle is covered with a resin, and one in which the surface of a resin particle is covered with a pigment are named.

It is preferable that an average particle diameter of the electrophoretic particles 5 be approximately from 0.1 to 10 µm, more preferable from 0.1 to 7.5 µm. If the average particle diameter of the particles is too small, the electrophoretic particles 5 tend to cluster. On the other hand, if the average particle diameter of the particles is too large, some kinds of the electrophoretic particles may become hard to be migrated.

Dispersing the electrophoretic particles 5 like this into the dispersion medium 6 is enabled by one method or a combination of two or more methods of the following: a paint shaker method, a ball mill method, a media mill method, an ultrasonic dispersion method, a stirrer dispersion method, for example.

As the dispersion medium 6, an organic solvent having a relatively high insulating property and a lower polarity than that of an aqueous dispersion liquid used for manufacturing the microcapsule 40 to be described later.

Examples of the organic solvent 6 other than the above may include aromatic hydrocarbons including benzene hydrocarbons such as benzene, toluene, o-xylene, m-xylene, p-xylene, Mixed-xylene, ethyl benzene, hexylbenzene, dodecylbenzene, and phenylxylyl ethane; paraffinic hydrocarbons such as n-hexane and n-decane; isoparaffinic hydrocarbons such as ISOPAR (available from Exxon Chemicals); olefin hydrocarbons such as 1-octene, 1-decene; aliphatic hydrocarbons including naphthenic hydrocarbons such as cyclohexane and decalin; carbon hydride series compounds made of petroleum or derived from petroleum such as Kerosene, petroleum ether, Petroleum benzine, Ligroin, industrial gasoline, Coal tar naphtha, Petroleum naphtha, Solvent naphtha; halogen hydrocarbons such as dichloromethane, chloroform, carbon tetrachloride, 1,2-dichloroethane, 1,1,1-trichloroethane, 1,1, 2,2-Tetrachloroethane, Trichlorofluoroethane, Tetrabromoethane, dibromotetrafluoroethane, tetrafluorodiiodoethane, 1,2-Dichloroethylene, Trichloroethylene, Tetrachloroethylene, Trichlorofluoroethylene, chlorobutane, chlorocyclohexane, chlorobenzene, o-dichlorobenzene, bromobenzene, iodomethane, diiodomethane, iodoform; silicone oils (organic silicone oils) such as Dimethyl silicone oil, methylphenyl silicone oil; and fluorinated solvent (organic fluorinated solvent) such as Hydrofluoroether. As the organic solvent 6, at least one kind is selected from these groups and favorably used.

Using the dispersion medium 6 like this can make electrophoretic migration of the electrophoretic particles 5 smooth and ensure that the electrophoretic dispersion liquid 10 can be a droplet in an aqueous medium in the method for manufacturing the microcapsule 40 described later so as to ensure manufacturing of the microcapsule 40 (the capsule body 50).

Further, among the organic solvents mentioned above, particularly long-chain alkylbenzene such as hexylbenzene and dodecylbenzene, and phenylxylyl ethane are preferably used as they have a low boiling point and a high firing point, besides they are hardly toxic.

Examples to be used as the organic solvent 6 other than the above may include cellosolve solvents such as methyl cellosolve, ethyl cellosolve and phenyl cellosolve; esters such as methyl acetate, ethyl acetate, butyl acetate, ethyl formate; and ketones such as acetone, methyl ethyl ketone, diethyl ketone, methyl isobutyl ketone, methyl isopropyl ketone, and cyclohexanone; alicyclic hydrocarbons such as yclohexane and methylcyclohexane; aromatic heterocycles such as pyridine, pyrazine, furan, pyrrole, thiophene, and methylpyrrolidone; nitryles such as acetonitrile, propionitrile, acrylonitrile; amides such as N,N-dimethylformamide and N,N-dimethylacetamide; and carboxylate salts.

In addition, if necessary, the following agents may be added to the dispersion medium 6 (the electrophoretic dispersion liquid 10): charge controlling agents formed of particles of electrolytes, surfactants, metal soaps, resins, rubbers, oils, varnishes, compounds or the like; and all sorts of additives such as dispersion agents that includes titanium coupling agents, aluminum coupling agents or silane coupling agents and the like, lubricating agents, and stabilizing agents.

Moreover, if necessary, the following agents may be solved in the dispersion medium 6: all sorts of dyes such as anthraquinone dye, azo dye, indigoid dye, triphenylmethane dye, pyrazolone dye, stilbene dye, diphenylmethane dye, xanthene dye, alizarin dye, acridine dye, quinonimine dye, thiazole dye, methine dye, nitro dye, nitroso dye, and the like.

The capsule body 50 encapsulates (incorporates) the electrophoretic dispersion liquid 10, and at least around the surface of the inner wall thereof is made of a polymer (a polymeric material) including a nonpolar resin which does not have polarity substantively or a resin material having a nonpolar group which does not have a polarity substantively as a side chain. Thus the inner wall of the capsule body 50 does not have polarity and adhesion of the electrophoretic particles 5 having a polarity in the electrophoretic dispersion liquid 10 is prevented. Therefore, adhesion of the electrophoretic particles 5 to the inner wall of the capsule body 50 is prevented for long periods and the microcapsule 40 in which the electrophoretic particles 5 can migrate smoothly is obtained. Accordingly, the electrophoretic display apparatus 20 (the electrophoretic display sheet) that can keep a fine display performance for long periods is obtained.

Here a non-polarity is defined as a state without a polarity or with a slight polarity.

In related art, the inner wall of the capsule body is covered with a surfactant including a hydrophobic functional group so as to intend to prevent adhesion of the capsule body and the electrophoretic particle. However, there is a problem such as sufficient prevention of adhesion is not served as the surfactant is detached from the capsule body as time passes.

On the other hand, in the invention, the capsule 50 is made of a polymer including (1) a resin material with a non-polarity, or (2) a resin material having a non-polarity group 51 as a side chain. Accordingly, the state of the non-polarity is prevented from clearing by detachment of the surfactant. As a result, the advantageous effect to prevent the capsule body 50 and the electrophoretic particles 5 from adhering each other lasts for long periods.

The cases of (1) and (2) will be described sequentially in detail below.

Case (1)

In this case, the capsule body 50 shown in FIG. 2 is made of a polymer including a resin material with a non-polarity, which does not have a polarity substantively. Thus the polarity of the capsule body 50 becomes small and adhesion of the electrophoretic particles 5 to an inner wall of the capsule body 50 is prevented.

As the capsule body 50 itself is in a non-polarity state, a variation of the polarity of the capsule body 50 can be prevented. Further, in a manufacturing process for the microcapsule 50 that will be described later, the manufacturing process can be simplified as an orientation of the nonpolar group does not need to be considered.

As the resin material that do not have a polarity substantively, one or two kinds of the resin materials such as styrene-divinylbenzene copolymer, styrene-isoprene copolymer and the like, can be combined to be used.

Among these, it is preferable to use the one made of a styrene-divinylbenzene copolymer as a main constituent. The Styrene-divinylbenzene copolymer is made of a vinyl group and phenyl group mainly, thereby having a particularly low polarity and serving a non-polarity. Thus, adhesion of the electrophoretic particles 5 to the capsule body 50 is prevented more assuredly.

Further, as the styrene-divinylbenzene copolymer has a high transparency, the electrophoretic particles 5 and the dispersion medium incorporated in the capsule body 50 are surely recognized with eyes. Thus, a display quality of the electrophoretic display apparatus 20 can be improved.

The styrene-divinylbenzene copolymer like this is a polymer obtained by radical polymerization whereby styrene monomers are cross-linked with a divinyl monomer. While the styrene monomer includes one vinyl group, divinyl monomer includes two vinyl groups. Therefore, by setting ratio thereof appropriately, a characteristic of the styrene-divinylbenzene copolymer obtained is adjustable.

For example, if an additive amount of the divinyl monomer is increased, the vinyl group is increased and more cross-linked structures are formed. As a result, the structure of the copolymer becomes high dense.

On the contrary, if the additive amount of the divinyl monomer is decreased, the cross-linked structures are also reduced. As a result, the density of the structure of the copolymer becomes low.

Accordingly, the styrene-divinylbenzene copolymer is preferably obtained by polymerizing the styrene monomer and the divinyl monomer at a molar ratio of from 70:30 to 99:1, more preferably obtained to be at the molar ratio of from 80:20 to 95:5. Accordingly, the styrene-divinylbenzene copolymer has flexibility with an attempt to have an adequate density at the part having non-polarity. As a result, the capsule body 50 can have moisture resistance and flexibility that can withstand deformation while sufficiently preventing the electrophoretic particles 5 from adhering.

The styrene-divinylbenzene copolymer like this has preferably the weight-average molecular weight of about 1000 to 1000000, more preferably about 30000 to 300000. Thus the density at the part having a non-polarity and flexibility of the styrene-divinylbenzene copolymer become more optimized.

Case (2)

In this case, as shown in FIG. 3, a nonpolar group 51 protrudes to a space inside of the capsule body 50.

Examples of the nonpolar group 51 are, for example, an alkyl group, a siloxanediyl group an aryl group, and an alkoxy group. One or a combination of two or more of these substances can be used.

Among these substances, especially the nonpolar group 51 is preferably an alkyl group and/or an alkyl fluoride group in which at least a part of hydrogen atoms in the alkyl group is substituted by fluorine atoms. The nonpolar group 51 has a structure that is especially hard to be charged. Therefore, the electrophoretic particles 5 are assuredly prevented from adhering to the capsule body 50.

The nonpolar group 51 preferably has the number of carbon atoms from four to twenty, and more preferably from 6 to 18. Thus the nonpolar group lasts sufficiently long as well as the nonpolar part covers a large area. Consequently, the electrophoretic particles 5 can keep a further distance from the inner wall of the capsule body 50 so as to prevent the electrophoretic particles 5 from adhering to the capsule body 50 assuredly.

Further, the nonpolar group 51 preferably forms a straight-chain shape or a branched shape. Thereby, when the number of carbon atoms is the same, the length of the nonpolar group 51 extending to the space becomes longer. As a result, the advantageous effect described above is more significantly demonstrated.

The resin material such as (1) and (2) are preferably included to a polymer that is mainly composed of at least one of gum arabic and gelatin. The polymer like this is favorably used as the constituent material of the capsule body 50 because of its high mechanical strength.

However, generally gum arabic and gelatin are polymers having a polarity, and thus the electrophoretic particles 5 are easy to adhere to them. On the other hand, as these polymers have a polarity, there is an advantage that a dispersion medium that has a low polarity can be used as the dispersion medium 6 encapsulated into the inside of the capsule body 50.

According to this, by including the resin material described above into the polymer like this, the inner wall has a non-polarity by the resin material. Thus, the capsule body 50 whose inner wall has a non-polarity is obtained while having the advantage of the polymer such as having a polarity.

Further, the content of the resin material in the polymer is preferably 5 wt % or more, more preferably 10 wt % or more. When the content of the resin material in the polymer fails to reach the lower limit, there may be a chance in which the capsule body 50 cannot be in a nonpolar state sufficiently depending on composition of the polymer and the resin material.

On the other hand, the upper limit of the content of the resin material in the polymer is not limited to, but is preferably 30 wt % or less, more preferably 20 wt % or less. When the content of the resin material in the polymer is beyond the upper limit, there may be a chance in which the advantage of the polymer cannot be obtained sufficiently because of the excessive resin material.

The types of the polymer are not limited to gum arabic and gelatin. For example, starch, methylcellulose or the like can be used.

Further, when the capsule body 50 forms a plurality of layers, at least a most inner wall is made of the polymer including the resin material of (1) or (2).

It is preferable that the plurality of microcapsules 40 be about the same size. Accordingly, the electrophoretic display device 20 can provide better display performance. The microcapsules 40 that are about the same size can be obtained by a filtration method and a specific gravity difference classification method, for example.

The size of each microcapsule 40 (average particle diameter) is not particularly limited, however, it is preferable about 10 to 150 μm, and more preferably about 20 to 100 μm.

Each of the microcapsules 40 encapsulates the electrophoretic dispersion liquid 10 inside.

The manufacturing method for the microcapsules 40 will be described later.

In the electrophoretic display device 20 including the microcapsules 40 like this, if a voltage is applied between the first electrode 3 and the second electrode 4, the electrophoretic particles 5 are electrophoresed toward one of the electrodes according to an electric field generated between the electrodes.

For example, as shown in FIG. 2A, in a case of using the electrophoretic particles 5 that are charged positively, the second electrode 4 has a positive electric potential. Accordingly, the electrophoretic particles 5 move toward the first electrode 3 to gather there. Therefore, the colors of the electrophoretic particles 5 can be seen from above the electrophoretic display device 20 (from the side of the display face).

Contrary, as shown in FIG. 2B, if the second electrode 4 has a negative electric potential, the electrophoretic particles 5 move toward the second electrophoretic 4 to gather there. Therefore, the colors of the dispersion medium 6 can be seen from above the electrophoretic display device 20 (from the side of the display face).

Consequently, properties (for example, color, positive or negative, an amount of electrostatic charge (a charging amount), and the like of the electrophoretic particles 5, polarities of the electrodes 3 and the electrodes 4, a potential difference between the electrode 3 and the electrode 4, and the like are suitably arranged to combine the colors of the electrophoretic particles 5 and the color of the dispersion medium 6 so as to display desired information (image) on the display surface of the electrophoretic display device 20.

It is preferable that a specific gravity of the electrophoretic particles 5 be arranged to be almost equal to that of the dispersion medium 6. Accordingly, the electrophoretic particles 5 can stay in a certain position in the dispersion medium 6 for a long period even after a voltage application between the electrode 3 and the electrode 4 is stopped. In other words, the information displayed on the electrophoretic display device 20 is kept for a long time.

A method for manufacturing the microcapsules 40 will now be described by each step sequentially.

Step 1

First, a monomer is added to the electrophoretic dispersion liquid 10 to be mixed. This monomer is selected depending on the constituent material of the capsule body 50 described above. Therefore following two cases (1) and (2) are provided. Each case will now be described sequentially.

Case 1

In this case, a combination of a styrene compound such as styrene and siloxanediyl-styrene, and a crosslinking agent such as divinylbenzene, terephthalic acid divinyl, and adipic acid divinyl is named as the monomer.

Alternatively, other than these monomers, a catalyst that accelerates a polymerization reaction of the monomer, such as benzoyl peroxide, can be added.

Case 2

In this case, as the monomer, one or more than one of compounds containing a relatively long-chain alkyl group and a relatively short-chain alkyl group can be combined to use. The compounds containing a long-chain alkyl group are: acrylic acid ester such as butyl acrylate, isononyl acrylate, isooctyl acrylate, octyl acrylate, lauryl acrylate, and stearyl acrylate; methacrylate ester such as octyl methacrylate, lauryl methacrylate, and stearyl methacrylate; acrylate compound such as isooctyl acrylate, 2-ethylhexyl acrylate; methacrylate compound such as tertiarybutyl methacrylate. The compounds containing a short-chain alkyl group are methyl acrylate, methyl methacrylate, 1,4-butanediol diacrylate and the like. The number of carbon atoms of the long-chain alkyl group of these is in the above-described range. At the same time, the nonpolar group 51 (alkyl group) can be assuredly fixed to the capsule body 50 by a short-chain alkyl group. Thus, adhesion of the electrophoretic particles 5 to a surface of the inner wall of the capsule body 50 is prevented more assuredly for long periods.

As a substitute of the material including the long-chain alkyl group described above, for example, 1,1,1,3,3,3-hexafluoroisopropyl methacrylate, trifluoroethyl methacrylate, perfluoroalkyl methacrylate, fluorine-containing methacrylate, fluorine-containing styrene are named. These materials can be used singly or in combination of two or more of them. At least a part of hydrogen atoms in the alkyl group is substituted by fluorine atoms to be an alkyl fluoride group that may constitute the nonpolar group 51. Since these materials do not have a polarity because of the alkyl group and show lyophobicity peculiar to fluorine atoms, an advantageous effect of adhesion prevention can be obtained more than or equal to that of the alkyl group.

Besides the monomer like this, a styrene compound such as siloxanediyl-styrene can be contained.

Alternatively, other than these materials, a catalyst that accelerates a polymerization reaction of the monomer can be added to the electrophoretic dispersion liquid 10.

As the catalyst, for example, azobisisobutyronitrile and methyl ethyl ketone peroxide are named.

Step 2

Next, the above-described polymer is added into a prepared aqueous dispersion medium to be solved. Accordingly, an aqueous medium is prepared.

The aqueous dispersion medium made of water such as distilled water, ion-exchange water, ultrapure water and reverse osmosis (RO) water only, or a aqueous dispersion medium containing water as a major ingredient and mixed with various lower alcohols such as methanol and ethanol is favorably used.

Further, a catalyst that accelerates encapsulation of the polymer can be added if needed.

As the catalyst, potassium persulfate is named, for example.

Step 3

Next, the electrophoretic dispersion liquid 10 that is prepared in the step 1 is provided to the aqueous dispersion medium for emulsifying and dispersing as a droplet. Thus a compound liquid having a droplet is obtained.

At this time, the electrophoretic dispersion liquid 10 can be dropped into the aqueous dispersion medium or added into the aqueous dispersion medium that is agitated. Alternatively, these methods can be combined.

Step 4

Next, the compound liquid obtained is agitated while being heated. Thereby a polymerization reaction of the monomer in the compound liquid is started so as to form the capsule body 50.

In this case, the heating temperature is preferably 50 to 100 degrees centigrade, and more preferably 70 to 90 degrees centigrade.

The time of agitation for the compound liquid is not limited, but it is preferable to be about 1 to 20 hours, more preferable to be about 3 to 10 hours.

The speed of agitation is preferably 50 to 3000 rpm, and more preferably 100 to 2000 rpm.

Step 5

Then, the compound liquid is filtered. Thus the microcapsules 40 are collected.

As a method for filtering, for example, ultrafiltration, Nano Filtration, microfiltration, Cake Filtration, reverse osmosis, screening are named. These methods can be used singly or in combination of two or more of them.

The microcapsules 40 can be dried if necessary.

Drying can be performed by various drying methods such as freeze-drying, through-flow drying, surface drying, fluidized drying, flash drying, vacuum drying, infrared drying, and high-frequency drying.

The microcapsules 40 that can prevent the electrophoretic particles 5 from adhering to the capsule body 50 for long periods are thus obtained.

Electronic Apparatus

An electrophoretic display device 20 mentioned above can be incorporated in various electronic apparatuses. An electronic apparatus according to the fourth aspect of the invention equipped with the electrophoretic display device 20 will now be described.

Electronic Paper

First, an embodiment in which the electronic apparatus according to fourth aspect of the invention is applied to an electronic paper will now be described.

Figure 5:
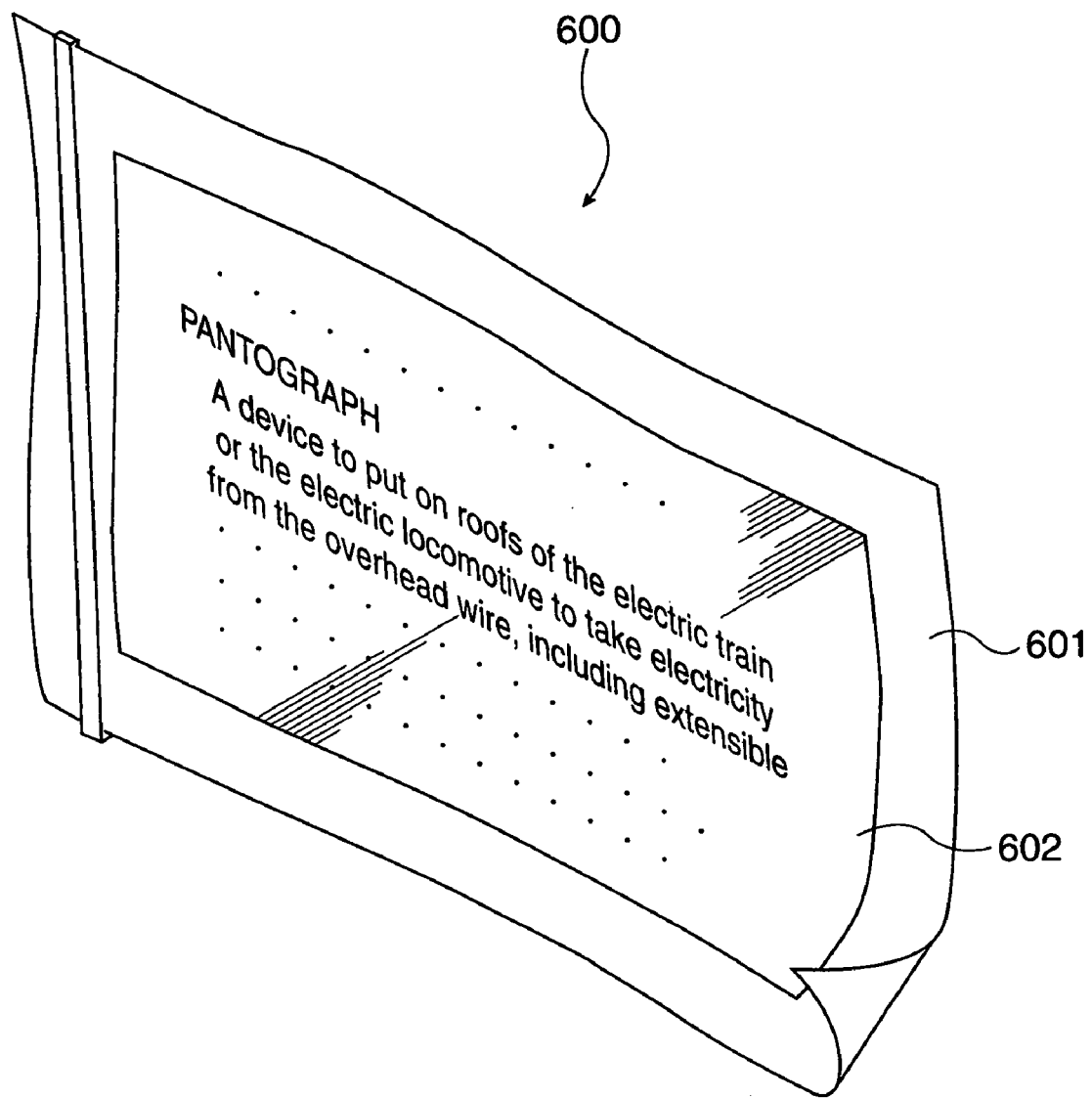
FIG. 5 is a perspective view showing an embodiment in a case of applying an electronic apparatus according to the invention to an electronic paper.

FIG. 5 is a perspective view showing the embodiment in which the electronic apparatus according to the fourth aspect of the invention is applied to an electronic paper.

An electronic paper 600 shown in FIG. 5 includes a main body 601 that is composed of a rewritable sheet having the same texture and flexibility as those of papers and a display unit 602.

In the electronic paper 600 mentioned above, the display unit 602 is made of the aforementioned electrophoretic display device 20.

Display

Next, an embodiment in which the electronic apparatus according to fourth aspect of the invention is applied to a display will be described.

Figure 6A:
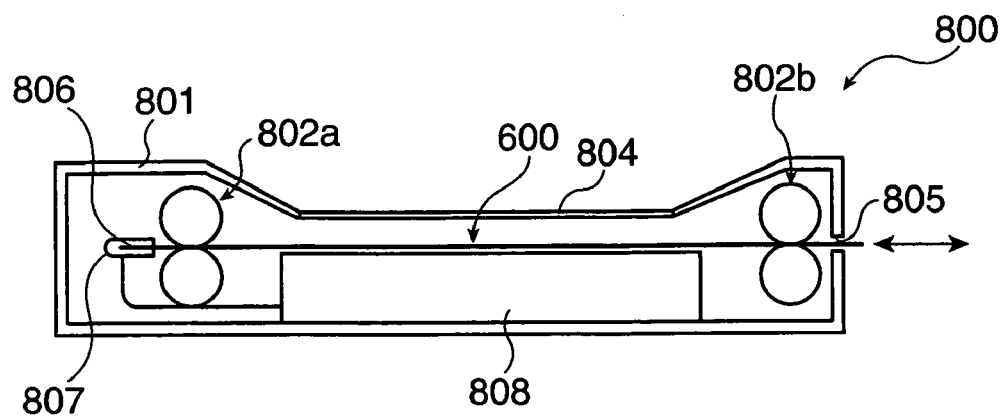
FIGS. 6A and 6B are diagrams showing an embodiment in a case of applying the electronic apparatus according to the invention to a display.
Figure 6B:
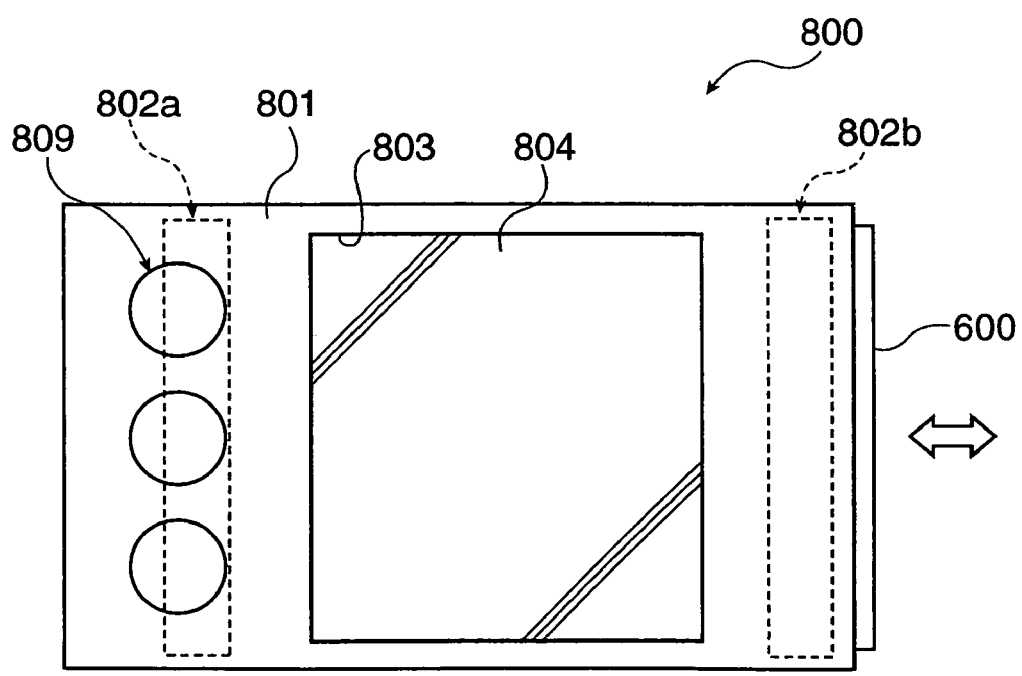

FIGS. 6A and 6B are diagrams showing the embodiment in which the electronic apparatus is applied to the display. FIG. 6A is a sectional view, and FIG. 6B is a plan view.

A display (a display device) 800 shown in FIG. 6 includes a main body 801, and the electronic paper 600 that is detachably fed into the main body 801. The electronic paper 600 has the structure as mentioned above, in particular, the same structure as that shown in FIG. 5.

The main body 801 has an insertion slot 805 on its side (right side in FIG. 6) into which the electronic paper 600 is inserted. The body 801 also has a pair of feed rollers 802a and 802b inside. When the electronic paper 600 is inserted through the insertion slot 805 into the main body 801, the electronic paper 600 is fed into the body 801, being sandwiched by the pair of feed rollers 802a and 802b.

The main body 801 also has a rectangular opening 803 on the display side of the main body 801 (front side in FIG. 6A). A transparent glass plate 804 is fitted in the opening 803. Accordingly, the electronic paper 600 fed into the main body 801 is visible from the outside of the main body 801. In other words, the display 800 makes a display by making the electronic paper 600 fed into the main body 801 visible through the transparent glass plate 804.

Also, a terminal 806 is provided at an end in the direction toward which the electronic paper 600 is inserted (left side in FIG. 6). Inside the main body 801, a socket 807 to which the terminal 806 is coupled when the electronic paper 600 is fed into the main body 801 is provided. The socket 807 is electrically coupled to a controller 808 and an operating unit 809.

In the display 800 like this, the electronic paper 600 is detachably fed into the main body 801, and thus can be detached from the main body 801 for portable use.

In the display 800, the electronic paper 600 is made of the electrophoretic display device 20 described above.

Examples of the electronic apparatus according to the invention is not limited to the above-mentioned, and include TV sets, finder-view sets, direct-view video recorders, car navigation systems, pagers, electronic notebooks, calculators, electronic newspapers, word processors, personal computers, workstations, videophones, point-of-sale devices, touch-sensitive panel devices, and so on. The electrophoretic display device 200 of the invention is applicable to the display of various types of electronic apparatuses like these.

The methods for manufacturing a microcapsule, an electrophoretic display sheet, an electrophoretic display device, and an electronic apparatus have been described based on the embodiments illustrated in the figures. However, the application of the invention is not limited to those described above. The constituents of each part can be may be replaced with any other constituents having similar functions. In other instances, other optional constituents can be added to the structures of the invention.

In the embodiments described above, the structure in which a pair of electrodes is provided to face each other is described, but it is not limited to this. For example, a structure in which a pair of electrodes is provided on the same substrate is also applicable.

Further, in the embodiments, a structure in which a pair of substrates is provided to face each other is described, but it is not limited to this. For example, a structure having a single substrate is also applicable.

In the embodiments, microcapsules are located to straddle two adjacent picture electrodes (electrodes), but it is not limited to this. For example, the microcapsules may be located to straddle three or more of adjacent picture electrodes or located without straddling adjacent picture electrodes. In addition, these arrangements may be mixed.

In the embodiments, a single microcapsule is arranged for two picture electrodes, but it is not limited to this. For example, a single microcapsule may be arranged for a single picture electrode, or a plurality of microcapsules may be arranged for a single electrode. Further, a single microcapsule may also be arranged for three or more of picture electrodes.

EXAMPLES

Specific working examples according to the invention will now be described.

1. Manufacturing an Electrophoretic Display Device

Example 1

1. An electrophoretic dispersion liquid was prepared by adding an acrylic resin particle (a electrophoretic particle) and a titanium dioxide particle (a electrophoretic particle) to dodecyl benzene. The titanium dioxide particle after surface modification by a coupling agent was used.
2. Stearyl acrylate (a monomer including a long-chain alkyl group having 18 carbon atoms), a mixture of methyl acrylate (a monomer), and azobisisobutyronitrile (a catalyst) were added to the electrophoretic dispersion liquid.
3. Next an aqueous medium was prepared by adding gum arabic (a polymer) and potassium persulfate (a catalyst) to distilled water. At this time, the additive amount of the gum arabic was set so that the content of the polymerized monomer (a resin material) in the polymer is 10 wt %.
4. Next, the electrophoretic dispersion liquid was delivered by drops into the aqueous medium prepared in the step 1 for emulsifying. A compound liquid was thus obtained.
5. The compound liquid obtained was agitated at an agitation speed of 1500 rpm for 6 hours while being heated at 80 degrees centigrade. After the agitation, gelatin was separated and deposited by pH adjustment, cooling, and cross-linking by formalin.
6. Then, microcapsules were collected from the compound liquid by screening.
7. Subsequently, ten of the electrophoretic display devices as shown FIG. 1 were manufactured using the microcapsules obtained. Specifications of each part are as follows.

First Substrate and Second Substrate
Size: 50 mm long, 50 mm wide, 100 μm thick
Constituent: polyethylene terephthalate
First Electrode and Second Electrode
Size: 40 mm long, 40 mm wide, 4 μm thick
Constituent: ITO
Binder
Constituent: urethane resin

Example 2

In the same manner as that of Example 1 other than that the polymer was changed to gelatin in the step 3, ten of electrophoretic display devices were manufactured.

Example 3

In the same manner as that of Example 1 other than that the additive amount of the gum arabic was changed so that the content of the polymerized monomer (a resin material) in the polymer was 5 wt % in the step 3, ten of electrophoretic display devices were manufactured.

Example 4

In the same manner as that of Example 1 other than that the additive amount of the gum arabic was changed so that the content of the polymerized monomer (a resin material) in the polymer was 30 wt % in the step 3, ten of electrophoretic display devices were manufactured.

Example 5

In the same manner as that of Example 1 other than that the monomer was changed to butyl acrylate (a monomer including a long chain alkyl group having five carbon atoms) in the step 2, ten of electrophoretic display devices were manufactured.

Example 6

In the same manner as that of Example 1 other than that the monomer was changed to trifluoroethylmethacrylate (a monomer including an alkyl fluoride group having six carbon atoms) in the step 2, ten of electrophoretic display devices were manufactured.

Example 7

In the same manner as that of Example 1 other than changes in which siloxanediyl-styrene and terephthalic acid divinyl were used as the monomer, and benzoyl peroxide was used as the catalyst in the step 2, ten of electrophoretic display devices were manufactured.

At this time, styrene monomer in the siloxanediyl-styrene and divinyl monomer in the terephthalic acid divinyl were added at a molar ratio of 90:10.

The styrene-divinylbenzene copolymer obtained had the weight-average molecular weight of 50000.

Example 8

In the same manner as that of Example 7 other than that the molar ratio of the styrene monomer and the divinyl monomer was changed to 97:3, ten of electrophoretic display devices were manufactured.

Example 9

In the same manner as that of Example 7 other than that the molar ratio of the styrene monomer and the divinyl monomer was changed to 70:30, ten of electrophoretic display devices were manufactured.

Comparative Example 1

In the same manner as that of Example 1 other than that fluorinated alkyl carboxylic acid potassium salt (a surfactant) was further added to the electrophoretic dispersion liquid, and the step 2 was omitted, ten of electrophoretic display devices were manufactured.

Comparative Example 2

In the same manner as that of Example 1 other than that the step 2 was omitted, ten of electrophoretic display devices were manufactured.

Evaluation

With respect to the electrophoretic display devices manufactured according to each example and each comparative example, change of the display performance thereof as time passes was examined. The change of the display performance was investigated by verifying the change in a contrast using a certain display pattern (display content) while the electrophoretic display devices were irradiated with ultraviolet rays. Then, evaluation was made according to criteria below.

A: No change after 3000 hours
B: Change was seen after 2000 to 3000 hours
C: Change was seen after 1000 to 2000 hours
D: Change was seen after 0 to 1000 hours The results of the evaluation above are shown in Table 1.

TABLE 1

| | Manufacturing condition of capsule body | | | | | | |
|---|---|---|---|---|---|---|---|
| | | Nonpolar group | | Content of resin material in polymer [wt %] | Molar ratio | | |
| | Composition of polymer | Types | Carbon atoms (pieces) | | Styrene monomer | Divinyl monomer | Evaluation |
| Example 1 | Gum arabic | Alkyl group | 18 | 10 | — | — | A |
| Example 2 | Gelatin | Alkyl group | 18 | 10 | — | — | A |
| Example 3 | Gum arabic | Alkyl group | 18 | 5 | — | — | B to C |
| Example 4 | Gum arabic | Alkyl group | 18 | 30 | — | — | B |
| Example 5 | Gum arabic | Alkyl group | 5 | 10 | — | — | B |
| Example 6 | Gum arabic | Alkyl fluoride group | 6 | 10 | — | — | A |
| Example 7 | Gum arabic | — | — | — | 90 | 10 | A |
| Example 8 | Gum arabic | — | — | — | 97 | 3 | B to C |
| Example 9 | Gum arabic | — | — | — | 70 | 10 | B |
| Comparative example 1 | Gum arabic | (surfactant) | — | — | — | — | C |
| Comparative example 2 | Gum arabic | — | — | — | — | — | C to D |

As clearly shown in Table 1, each of the electrophoretic display devices manufactured according to each example (the electrophoretic display devices of the invention) did not show any changes in the contrast from their initial condition after 2000 hours.

In particular, each of the electrophoretic display devices manufactured in Example 1, Example 2, Example 6 and Example 7 showed a good condition without any changes in contrast after 3000 hours.

On the other hand, the electrophoretic display devices manufactured in the comparative examples had some pixels that did not show normal display after 1000 to 2000 hours and contrast thereof was lowered.

In particular, the electrophoretic display devices manufactured in Comparative example 2 showed such phenomenon within 1000 hours.

What is claimed is:

1. A microcapsule, comprising:
   a dispersion liquid;
   an electrophoretic; and
   a capsule body that encapsulates the dispersion liquid and the electrophoretic particle,
   the capsule body including a resin material, the resin material having a nonpolar group as a side chain, the nonpolar group having at least one of an alkyl group and an alkyl fluoride group.

2. An electrophoretic display sheet, comprising:
   a first substrate; and
   the microcapsule according to claim 1, being formed on the first substrate.

3. An electrophoretic display device, comprising:
   the electrophoretic display sheet according to claim 2; and
   a second substrate formed on the microcapsule to hold the micro capsule with the first substrate by sandwiching the microcapsule.

4. An electronic apparatus, comprising the electrophoretic display device according to claim 3.

5. A microcapsule, comprising:
   an electrophoretic dispersion liquid including at least one kind of electrophoretic particle having a polarity; and
   a capsule body encapsulating the electrophoretic dispersion liquid, the capsule body being made of a polymeric material including at least a resin material, the resin material having a styrene-divinylbenzene copolymer having a weight-average molecular weight of from 1000 to 1000000.

6. The microcapsule according to claim 5, wherein the polymeric material includes at least one of gum arabic and gelatin.

7. A microcapsule, comprising:
   a dispersion liquid;
   an electrophoretic particle; and
   a capsule body that encapsulates the dispersion liquid and the electrophoretic particle,
   the capsule body including a resin material, the resin material having a nonpolar group as a side chain, the nonpolar group having a plurality of carbons, a range of a number of the plurality of carbons being from four to twenty.

8. A microcapsule, comprising:
   a dispersion liquid;
   an electrophoretic particle; and
   a capsule body that encapsulates the dispersion liquid and the electrophoretic particle,
   the capsule body including a resin material, the resin material having a nonpolar group as a side chain, the nonpolar group forming one of a straight-chain shape and a branched shape.

9. A microcapsule, comprising:
   a dispersion liquid;
   an electrophoretic particle; and
   a capsule body that encapsulates the dispersion liquid and the electrophoretic particle,
   the capsule body including a styrene-divinylbenzene copolymer, a range of a weight-average molecular weight of the styrene-divinylbenzene copolymer being from 1000 to 10000.

* * * * *